United States Patent
Srinivasan et al.

(10) Patent No.: US 12,470,483 B2
(45) Date of Patent: Nov. 11, 2025

(54) DATA PACKET TRAFFIC USING SPECULATIVE UNIFIED FLOW

(71) Applicant: Microsoft Technology Licensing, LLC, Redmond, WA (US)

(72) Inventors: Harish Srinivasan, Sammamish, WA (US); Tian Tan, Kirkland, WA (US); Milan Dasgupta, Seattle, WA (US); Denys Gurzhii, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 342 days.

(21) Appl. No.: 18/069,166

(22) Filed: Dec. 20, 2022

(65) Prior Publication Data

US 2024/0205148 A1 Jun. 20, 2024

(51) Int. Cl.
*H04L 45/74* (2022.01)
*H04L 45/76* (2022.01)

(52) U.S. Cl.
CPC .............. *H04L 45/74* (2013.01); *H04L 45/76* (2022.05)

(58) Field of Classification Search
None
See application file for complete search history.

(56) References Cited

U.S. PATENT DOCUMENTS 9,356,866 B1 * 5/2016 Sivaramakrishnan .. H04L 45/50
2021/0281582 A1 9/2021 Akella

OTHER PUBLICATIONS

International Search Report and Written Opinion received for PCT Application No. PCT/US2023/036966, Feb. 22, 2024, 13 pages.

* cited by examiner

*Primary Examiner* — Christine T Duong
(74) *Attorney, Agent, or Firm* — Alleman Hall & Tuttle LLP

(57) ABSTRACT

A method is presented for processing directional data packet traffic. A main data packet, characterized by a plurality of main data packet characteristics including at least a first IP address representing a first source, and a second IP address representing a first destination, is received at a rule processing engine. Based on the main data packet characteristics, a set of rules for processing the main data packet is retrieved. A main direction unified flow for the main data packet, and a speculative reverse direction unified flow for a reverse direction data packet are generated based on the main data packet characteristics and the retrieved set of rules. The main data packet is processed based on the main direction unified flow. Responsive to receiving the reverse direction data packet, the reverse direction data packet is processed based on the speculative reverse direction unified flow.

18 Claims, 7 Drawing Sheets

DATA PACKET TRAFFIC USING SPECULATIVE UNIFIED FLOW

BACKGROUND

As more and more computing work relies on cloud-based platforms and virtualization, a key challenge is to increase the frequency of connections between client devices and the virtual machines, e.g., how many times per second connections can be opened and closed. Clients demand higher rates and total volumes of connections to allow more customer connections to websites, databases, etc. Reducing the compute cost of setting up a connection may allow for increased frequency and total volume without increasing hardware resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method is presented for processing directional data packet traffic between a client device and a virtual machine. A main data packet, characterized by a plurality of main data packet characteristics including at least a first internet protocol (IP) address representing a first source, and a second IP address representing a first destination, is received at a rule processing engine. Based on the main data packet characteristics, a set of rules for processing the main data packet is retrieved. A main direction unified flow for the main data packet, and a speculative reverse direction unified flow for a reverse direction data packet are generated based on the main data packet characteristics and the retrieved set of rules. The main data packet is processed based on the main direction unified flow. Responsive to receiving the reverse direction data packet, the reverse direction data packet is processed based on the speculative reverse direction unified flow.

DETAILED DESCRIPTION

Figure 1:
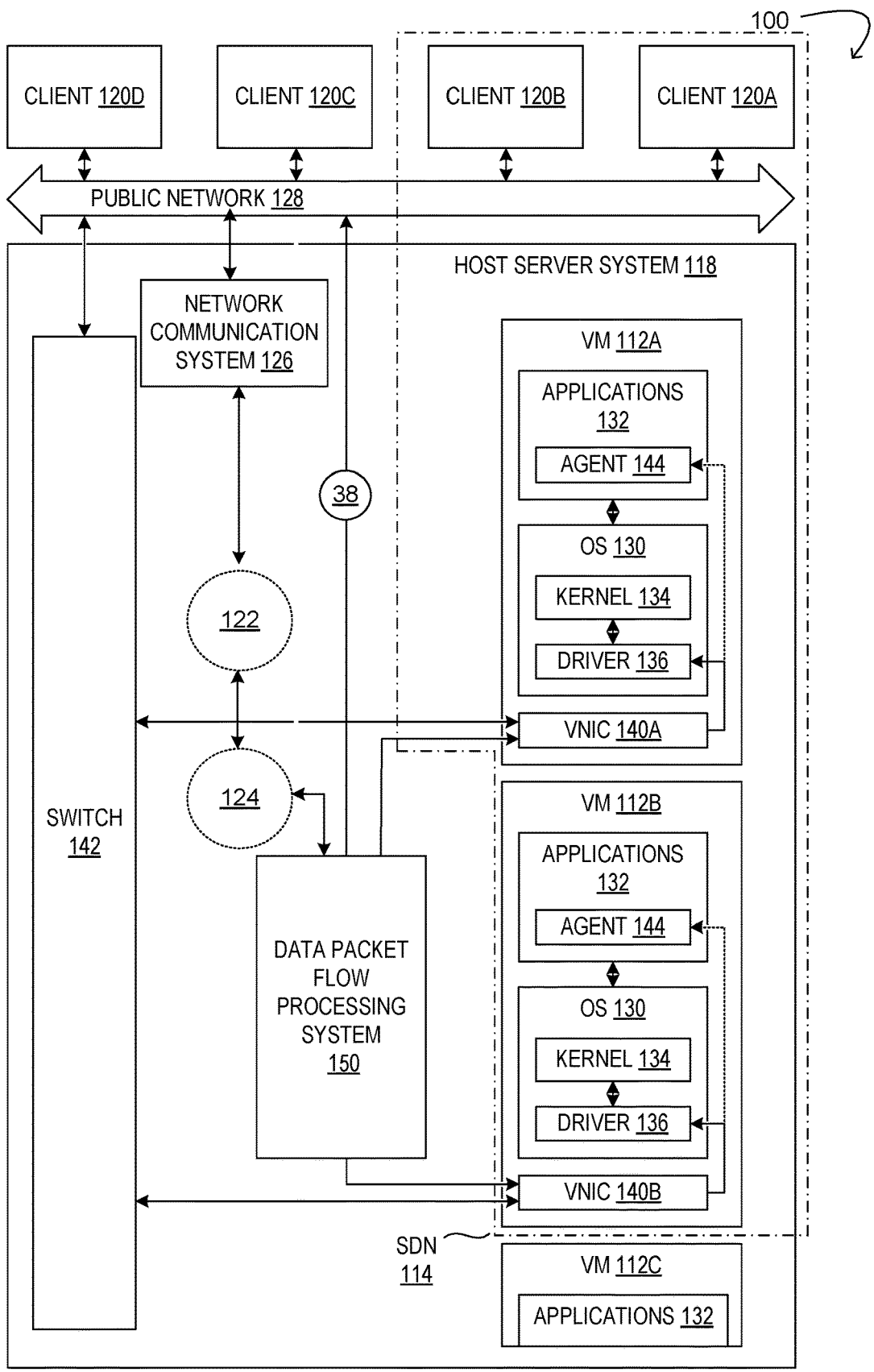
FIG. 1 schematically shows aspects of an example cloud computing environment.

Networking features and cloud providers are backed up by software defined networking (SDN) architectures. SDN operates by separating the control logic from routers and switches, logically centralizing it within a software-implemented controller. In this architecture, the controller communicates with the data plane (e.g., switches) through a control channel. Each data packet handled under SDN programming arrives with a set of parameters, such as a source IP address, a destination IP address, etc. Based on the data packet parameters the SDN programming either [1] allows the data packet through, [2] modifies the data packet or [3] blocks the data packet.

These simple rules allow for the construction of networking features such as virtual networks, load balancing gateways, etc. Each virtual network and load balancer is accompanied by a list of rules instructing how to handle data packets. In some examples, a layering model is used, where multiple rules are layered on top of each other, necessitating sequential processing that can become costly.

Once a data packet has been processed through a set of rules, this information can be saved in a network flow. For each connection, there is generally one network flow for outbound processing, and a second network flow for inbound processing. These may also be referred to as unified flows, in which multiple rules are evaluated, compressed, and unified. Each unified flow may allow the rule set to be applied to other data packets that share similar characteristics. The pair of inbound/outbound unified flows are linked in order to track their state.

SDN processing often involves processing these two flows in a connection in a joint manner. Such processing includes creating and deleting both flows together. A shared state is created during the processing of one flow and used in the processing of the other flow. In prior systems, when a data packet is brought to the stack, associated lists of inbound rules and outbound rules are evaluated and executed independently. This creates a bottleneck to getting a data packet through the stack. By alleviating this bottleneck, cost to set up connections and traffic data packets can be reduced significantly.

Herein, systems and methods are presented that accelerate networking stacks by setting up a connection at the instance of a first data packet pointed in a main direction, rather than waiting for the return data packet in the reverse direction to set up the connection.

Upon receipt of a first, main direction data packet, the main direction rules are evaluated, and predictions made as to what the rules will be for the corresponding reverse direction data packet. During the processing of the main direction flow, both a main direction Unified Flow (UF) and a speculative reverse direction UF are created. These two UFs are associated together by sharing the same flow state entry, which allows states to be shared between two flows.

The speculative reverse UF is stored in a speculative state until any data packet in that reverse flow is received by the system. Thereupon, parameters from the reverse direction data packet are used to convert the speculative flow into a standard flow. This allows for scaling up and increasing the number of connections while at the same time simplifying software algorithms to exploit limited computing resources.

A cloud-computing environment may include a host server system and a plurality of networked client devices. The client devices may be permitted to access certain resources of the host server system, such as processing, network, and/or data-storage resources. To this end, the host server system may instantiate and host one or more 'virtual machines' (VMs), allowing authorized client devices network access to the VMs. More particularly, one or more of the VMs may be configured as nodes on an SDN. FIG. 1 shows aspects of an example cloud-computing environment 100, with virtual machines 112A, 112B, and 112C configured as a nodes of SDN 114.

Cloud-computing environment 100 includes an example host server system 118 and a plurality of client devices 120 (e.g., client device 120A, 120B, 120C, 120D). The example host server system includes a distributed logic system 122 comprising a series of multicore central processing units (CPUs) and graphics processing units (GPUs). The example host server system includes a distributed computer-memory system 124 of data- and instruction-storage subsystems. The subsystems of the computer-memory system may differ with respect to data-storage capacity and storage-retrieval latency. For instance, the computer-memory system may include an optical data-storage subsystem of very high capacity and relatively high latency, and a flash-memory subsystem of lower capacity and much lower latency.

Example host server system 118 also includes a network-communication system 126 configured for high-speed, high-bandwidth network connectivity. In some examples, the network-communication system may support bidirectional, high-speed internet connectivity via cable and/or fiber-optic transmission. In FIG. 1, the example host server system 118 is illustrated as a unitary structure, but that aspect is not strictly necessary. In some examples, the various components of the host server system may be distributed geographically and coupled operatively via distributed componentry of the network-communication system.

Client devices 120 may include virtually any type of computer device having network connectivity. A client device may have a display and a keyboard, and/or other componentry to enable direct user interaction. As nonlimiting examples of client devices, desktop, laptop, and tablet computers, smart phones, gaming consoles, mainframes, mainframe terminals, and other types of client devices are all equally envisaged. Although only four client devices are represented in FIG. 1, the number of client devices in cloud-computing environment 100 is not particularly limited.

Via a secure network protocol conveyed over public network 128, each client device 120 may access a portion of the computer resources of host server system 118. Such resources may include processing resources, data and data-storage resources, and network resources, for instance. In one example, client devices 120A and 120B may use one portion of the host server system to coordinate an e-commerce operation. Concurrently, client device 120C may use another portion of the host server system to execute sophisticated quantum-chemistry computations directed to drug discovery.

To these ends and others, host server system 118 may be configured to emulate the operation of a hypothetical series of nominally independent computer systems, each accessed by one or more client devices 120. Here and elsewhere, each of the emulated computer systems is referred to as a 'virtual machine' (VM), which is 'hosted' by the host server system. FIG. 1 shows VMs 112A, 112B, and 112C; in other examples, additional VMs or fewer VMs (as few as one) may be hosted, and the number of hosted VMs may be adjusted as desired. In some examples, each VM 112 is configured, via software executing on host server system 118, to operate like a personal computer (PC) or workstation. In particular, each VM may execute an operating system (OS) 130 of a PC or workstation, in addition to any applications 132 supported by the OS, but with enhanced processing power, data-storage, and/or network bandwidth.

In some examples, the OS and applications running concurrently on different hosted VMs of the host server system may differ.

Like any physical PC or workstation, each VM 112 may be configured as a node of one or more computer networks. In the illustrated example, VMs 112A and 112B are nodes of SDN 14, which also includes client devices 120A and 120B. In the illustrated configuration, host server system 118 provides network access to the one or more hosted VMs. Plural VMs may be joined to the same network or to different networks, depending on the implementation.

SDN 14 provides valuable flexibility in network configuration. Without any hardware manipulation, a new SDN with VMs and client devices as nodes may be created in cloud-computing environment 100. Nodes may be added to or deleted from the network, renamed, and dynamically assigned new IP addresses, for example, and when an SDN is no longer needed it may be promptly dissolved. Moreover, the SDN approach enables the same physical network to be shared across multiple workloads, by virtualizing the address range by which the nodes of the network are accessed.

Continuing in FIG. 1, OS 130 of each VM 112 includes a network-interface card (NIC) driver 136. In the hypothetical case in which the OS were running directly on a non-virtualized machine, the NIC driver would receive hardware notifications—e.g., interrupt requests (IRQs)—from a physical NIC installed in the machine and connected to a network by a cable. For instance, the NIC might connect to a local-area network (LAN) via an Ethernet cable. There, a link-state notification (LSN) would be raised by the NIC in response to initial connection or reconnection of the network cable. In some OSs, receipt of an LSN by the NIC driver automatically triggers a new dynamic host configuration protocol (DHCP) request by kernel 134.

In each VM 112, however, NIC driver 136 is communicatively coupled to host network 138 through a virtual port of a virtual network card (VNIC) 140 (VNIC 40A, 40B, etc.). The VNIC, in turn, is connected to a virtual network switch 142, which regulates the exchange of data with host network 138. Since the virtual port is non-physical, certain properties normally detected by NIC driver 136 and subsequently handled in kernel 134 have no physical significance in the VM implementation.

In some examples, the various computer systems of cloud-computing environment 10 may communicate via a private wide-area network (WAN) in lieu of public network 28. In some examples, an SDN may be comprised entirely of VMs, which communicate to client devices 20 on a different network.

Data packet flow processing system 150 may receive data packets from clients and VMs, process the data packets according to rules in a flow, and/or manage their distribution between devices. Examples of data packet processing are described further herein.

Figure 2:
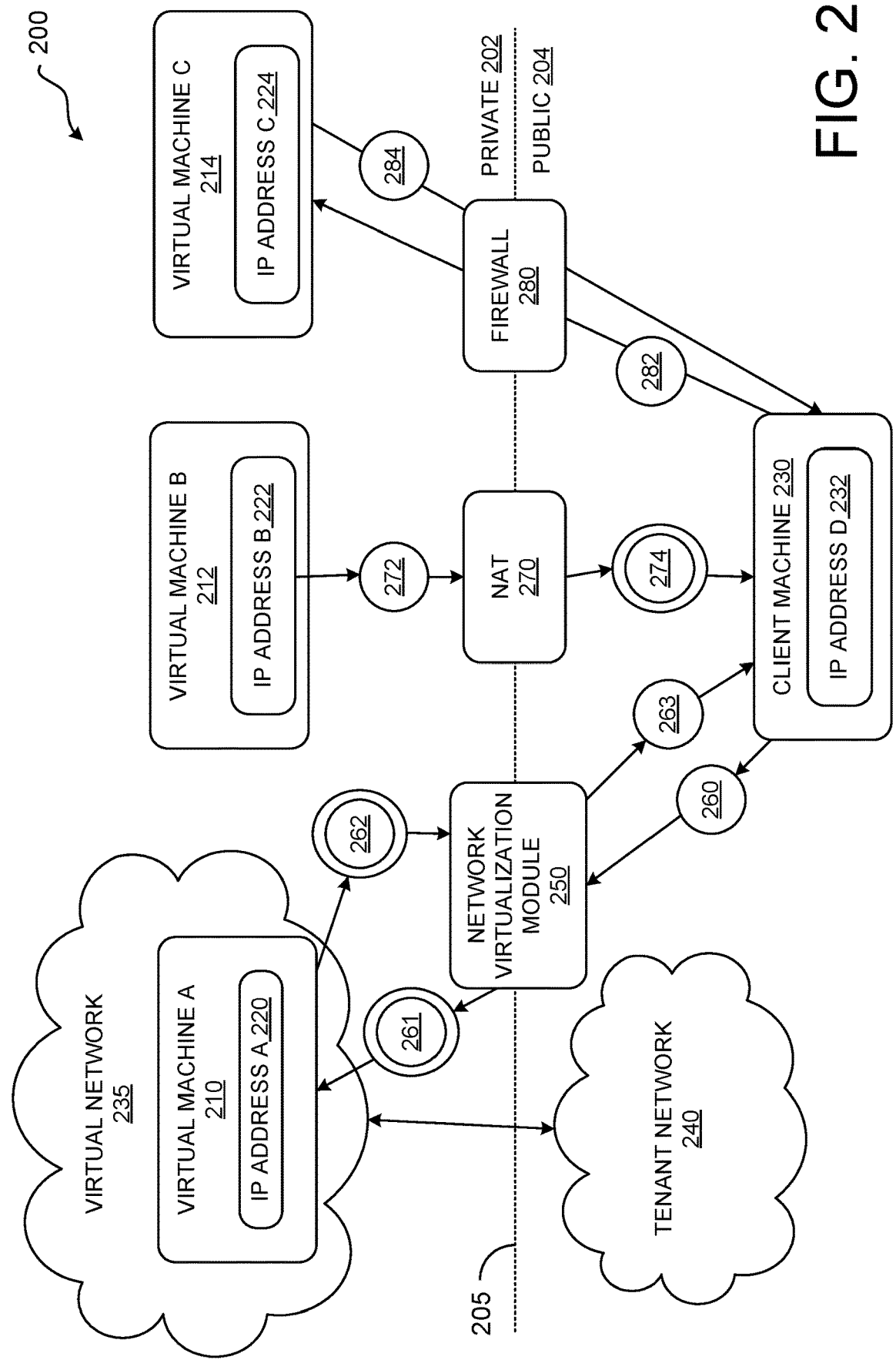
FIG. 2 schematically shows an example computing environment including a private network and a public network.

FIG. 2 shows an example computing environment 200 comprising a private network 202 and a public network 204. A network interface 205 between private network 202 and public network 204 governs the trafficking and flow of data packets between computing machines locate on private network 202 and public network 204.

In this example, private network 202 comprises three virtual machines—virtual machine A 210 virtual machine B 212, and virtual machine C 214. Each virtual machine has a unique IP address that may be used to direct communications, data packets, etc. Virtual machine A 210 can be targeted at IP address A 220, virtual machine B 212 can be targeted at IP address B 222, and virtual machine C 214 can be targeted at IP address C 224.

A client machine, such as client machine 230 also has an IP address (IP address D 232). Data packets sent between client machine 230 and any of virtual machines 210, 212, and 214 include a plurality of characteristics, such as an origin IP address and a destination IP address. Characteristics may further include identifiers or headers for ports, ethernet, media access control (MAC) addresses, LAN addresses, etc., as well as characteristics of an accompanying data payload.

Data packets that reach network interface 205 in either direction may be subject to a set of rules (e.g., allow, modify, block) in order to be processed in a flow en route to their destination.

In one example, virtual machine A 210 may be located within a virtual network 235. Virtual networking may allow tenants to bring their own IP space into private network 202 and work in conjunction with the server hosting their virtual machine. For example, virtual network 235 is a representation of tenant network 240.

Other tenants may be occupying adjacent spaces on virtual network 235, and thus rules are needed that allow the tenant to attain network performance that isolates them from other tenants, behaving as if virtual machine A 210 belongs to a separate ecosystem.

To facilitate this virtual networking, network virtualization module 250 may carry out a rule by encapsulating data packets originating from public network 204 (e.g., client machine 230) with a network header that directs the data packets to virtual machine A 210 at IP address B 220. As an example, network virtualization module 250 may use an encapsulation protocol such as virtual extensible local area network (VXLAN). Network virtualization module 250 may also de-encapsulate encapsulated data packets directed back to client machine 230.

As an example, client machine 230 may direct an unencapsulated data packet 260 to virtual machine A 210. Network virtualization module 250 receives unencapsulated data packet 260 and encapsulates unencapsulated data packet 260 with a network header that directs main direction encapsulated data packet 261 to IP address A 220. Virtual machine A 210 receives main direction encapsulated data packet 261, and processes main direction encapsulated data packet 261 according to a flow. Virtual machine A 210 then outputs reverse direction encapsulated data packet 262, which may be directed to another virtual machine within virtual network 235 without further modification. Network virtualization module 250 receives and de-encapsulates reverse direction encapsulated data packet 262 to form de-encapsulated data packet 263, which is directed to client machine 230 without a trace of the applied network header.

By assigning network headers in this way, private network 202 can also effectively handle traffic between tenants by maintaining the network header for internal traffic of data packets. In this way, tenants, clients, and virtual machines on both ends of the process see the IP addresses they expect, and data packet traffic can be facilitated as such.

As another example, a Network Address Translator (NAT) 270 operates as an interface between private network 202 and public network 204 by mapping the private address space of private network 202 into the public address space of public network 204.

Load balancing in a virtual network may provide customers a public IP address that can be given to clients. NAT 270 may take that public IP address and append it to any data packets that are sent from the private network to the public domain. For example, virtual machine B 212 may output data packet 272, directed towards client machine 230 at IP address D 232. NAT 270 may modify data packet 272 with the public IP address, and transmit modified data packet 274 to client machine 230.

Client machine 230 thus sees the public IP address. If the client responds, they will address their response to the public IP address. NAT 270 catalogs these connections, so that the IP address is consistently translated between public and private IP addresses. In this way, the client does not see the private IP address, but data packets can be targeted to the proper destination. NAT 270 can be employed to emulate a public IP address for a virtual machine B 212 on private network 202.

This enables decoupling of the control of private network 202 and how it operates from the actual hardware. From the perspective of a tenant, they see their virtual machine being able to communicate to everyone else. The rules enforced by NAT 270 facilitate this interaction.

Another example of such rules includes customer-defined rules for firewalling. Clients will indicate rules for certain traffic to be selectively allowed or denied via firewall 280. To honor that selectivity dynamically, the rules cannot be entirely hard coded either for any topology.

As an example, client machine 230 may direct data packet 282 to virtual machine C 214 at IP address C 224, requiring clearance at firewall 280. Generally, reverse traffic is allowed through firewall 280 if the main direction traffic was allowed. As such, response data packet 284 can be transmitted virtual machine C to client machine 230 via firewall 280.

In the examples described with regard to FIG. 2, the data packets undergo trafficking in two directions, and are subject to rules in each direction according to a flow. The rules in each direction are generally processed separately, with the reverse flow not considered until a reverse direction data packet arrives. However, from these examples it is clear that at least some of the reverse flow rules are predictable from the data packet characteristics and the rules of the main direction flow (e.g., encapsulation/de-encapsulation).

Connections between devices may be initiated by the client device or the virtual machine, and thus may be considered inbound or outbound, depending on the perspective. Herein, the first data packet described as trafficking in a first, or main direction, and a main unified flow governs that traffic. A reverse direction unified flow governs traffic of a second data packet, trafficking in the opposite direction. For the main direction, the rules are addressed as prescribed. Rather than waiting for the reverse direction data packet to arrive, and then reevaluating the entire set of rules, a set of educated assumptions can be made about what is likely to occur. As such, for the reverse direction, a speculative template flow may be generated based on the rules and parameters for the main direction. Speculation assumes that the destination of the original flow talks back to the origin, which is generally the case. Upon receipt of the reverse direction data packet, the speculative template is completed based on associated parameters and rules to generate a standard flow. In general, the adjustments to the speculative flow do not entail reevaluating the rules. Rather, speculative values are adjusted, or spaces left blank are filled in.

In general, a flow may be considered the sum total of all the rules that are applied to a data packet that affect how it moves from its source to its destination. A sequence of data packets trafficking between a common source and destination IP address exhibit similar patterns of parameters, and may be subject to the same or similar rules. As such, a main unified flow may be stored so it does not have to be re-generated for each data packet. Once a standard reverse flow is generated, this flow may also be stored and applied to subsequent data packets. As such, no further rule processing is required and the flow is either enabled or some action is taken on the data packet according to the rule set.

The speculation includes projecting what the reverse direction data packet may look like—even if it were to remain unchanged. Certain changes that happen to the data packet in the main direction may block traffic of the data packet in the reverse direction or require additional adjustments. The parameters of the original data packet may provide clues that allow for an accurate speculation. Further assumptions can be made based on the particulars of the rules that are applied to the main flow as to what further changes would be applied on top of that flow in the reverse direction. If certain rules are applied that create changes to the data packet in one direction, there may be obvious actions to reverse or undo those changes to allow for flow in the opposite direction.

Speculation may also apply to internal processing details, although not every aspect of data packet modification is visible to both parties in the course of processing a data packet. For example, accounting and billing details may be maintained for data packets but may not traffic with the data packet. This information can be derived as part of speculation but may not be exposed on the network as such.

Figure 3:
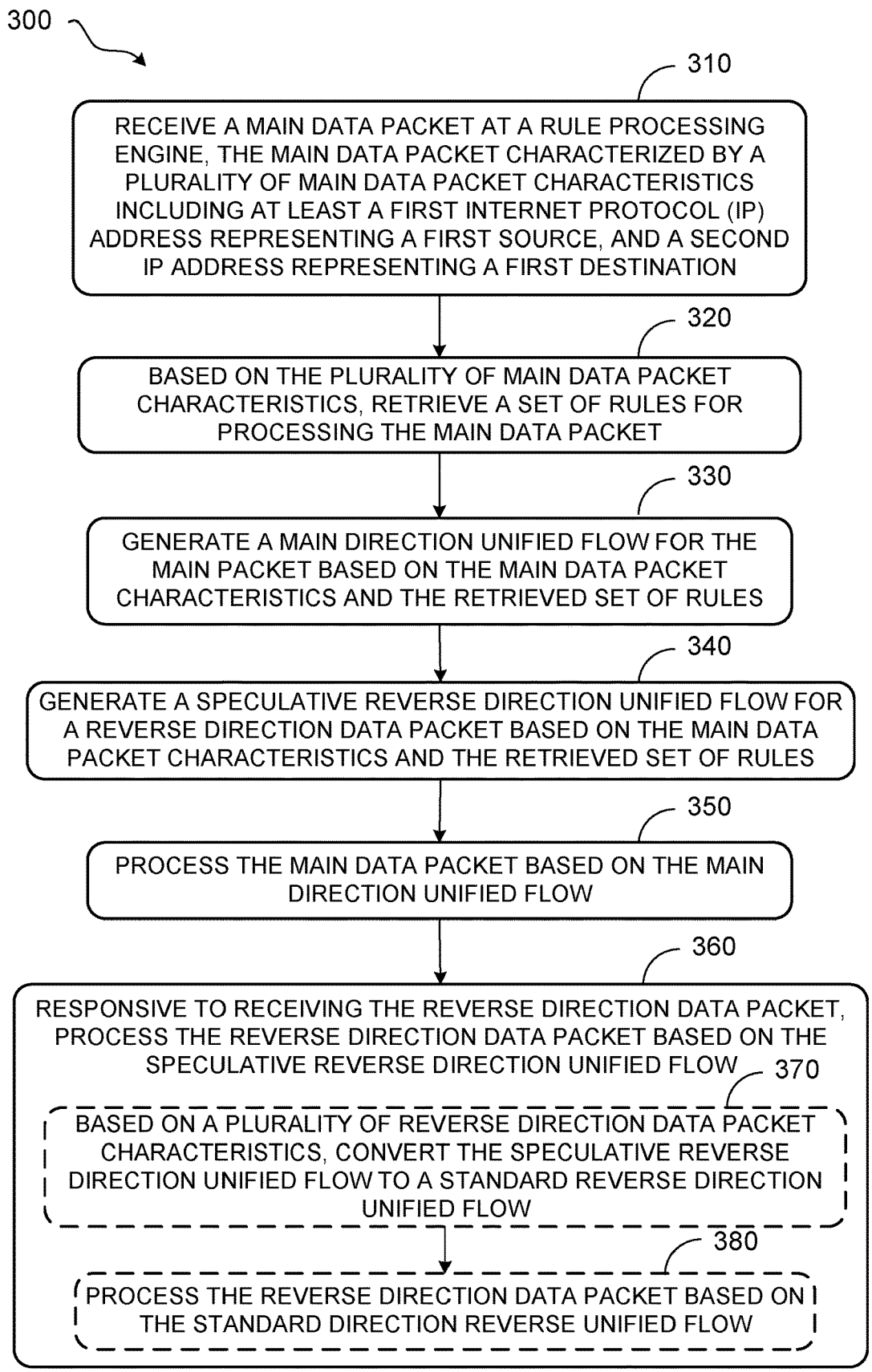
FIG. 3 is a flow diagram for an example method for processing directional data packet traffic between a client device and a virtual machine.

FIG. 3 shows a flow diagram for an example method 300 for processing directional data packet traffic between a client device and a virtual machine. Method 300 is implementable as hardware, software, virtual machines, or any combination thereof. Method 300 may be applied to any direction data packet traffic wherein data packets are trafficked bidirectionally between two computing entities, including, but not limited to virtual networking, load balancing, transfer protocols, firewall traversal, etc.

At 310, method 300 comprises receiving a main data packet at a rule processing engine, the main data packet characterized by a plurality of main data packet characteristics including at least a first IP address representing a first source, and a second IP address representing a first destination. In some examples, the first IP address is for the virtual machine. In other examples, the second IP address is for the virtual machine. In some examples, the client device is a virtual machine. Other main data packet characteristics may include, but are not limited to source and destination ports, protocols, MAC addresses, LAN addresses, data payload characteristics, etc.

Figure 4:
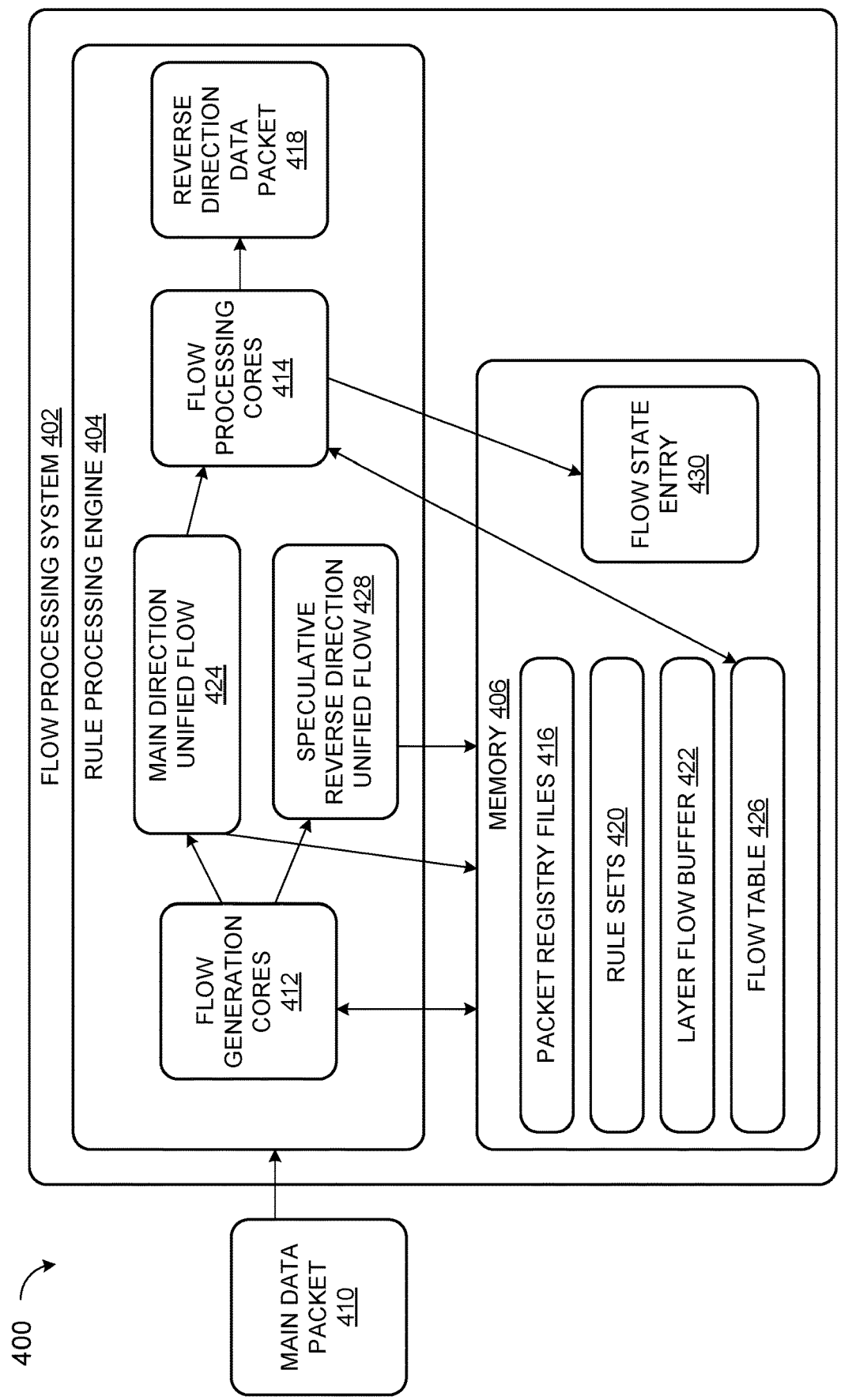
FIG. 4 schematically shows a system for processing directional data packet traffic between a client device and a virtual machine in a first state.
Figure 5:
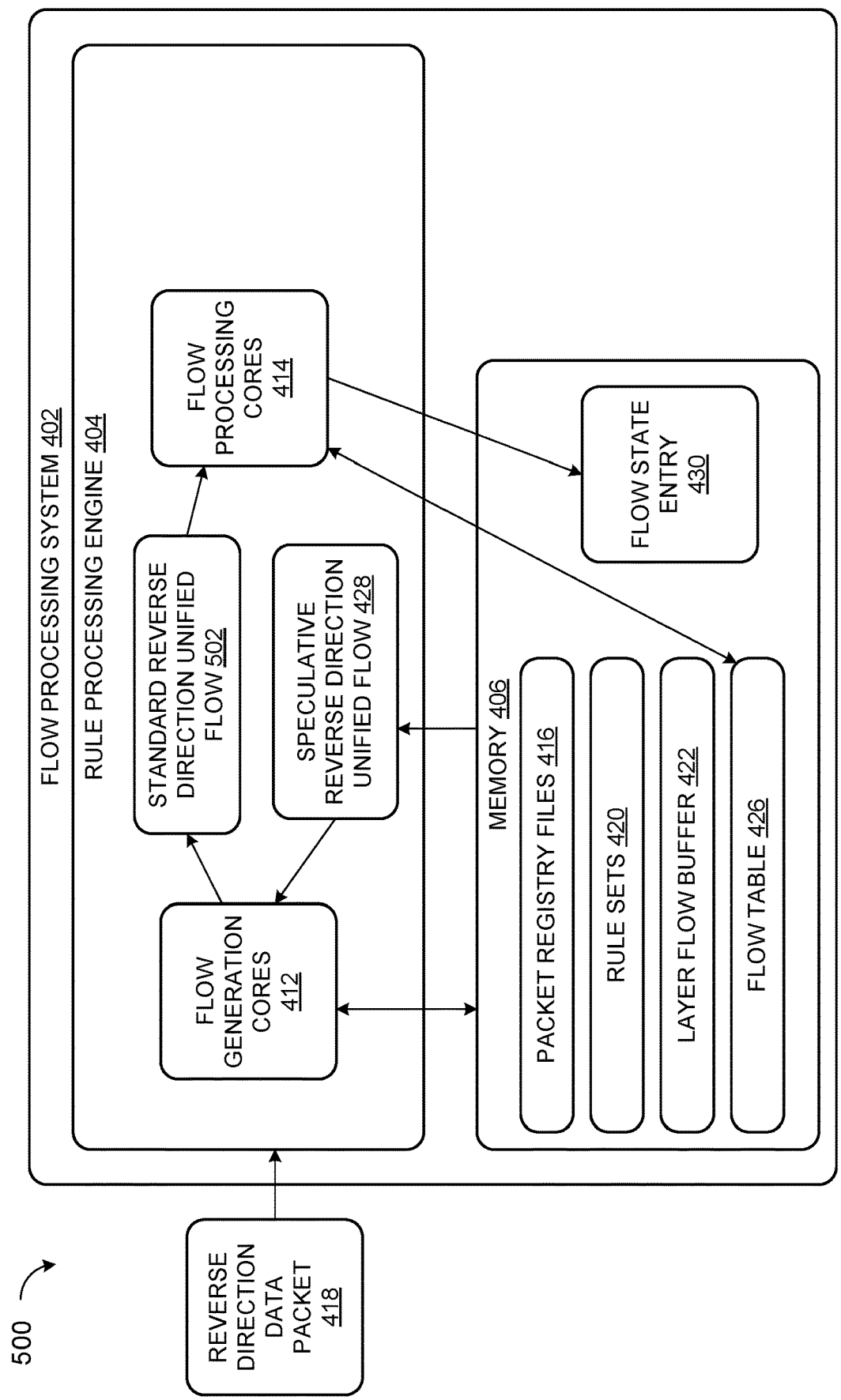
FIG. 5 schematically shows the system of FIG. 4 in a second state.

As an example, FIGS. 4 and 5 schematically show an example system for executing method 300. Referring to FIG. 4, at 400, a flow processing system 402 is shown in a first state. Flow processing system 402 includes at least a rule processing engine 404 and a memory 406. Rules processing engine 404 receives a main data packet 410. Main data packet 410 may be received from a client device, a virtual machine, a local flow table, etc.

Rules processing engine 404 includes one or more flow generation cores 412, and one more flow processing cores 414. Flow generation cores 412 schedules main data packet 410 for subsequent processing by flow processing cores 414. Flow generation cores 412 may populate packet registry files 416 with characteristics of main data packet 410. Such packet registry files 416 may be stored in memory 406, and may include both a registry file for main data packet 410, and an expected reverse direction data packet 418.

Returning to FIG. 3, at 320, method 300 comprises, based on the plurality of main data packet characteristics, retrieving a set of rules for processing the main data packet. As described herein, the rules may indicate whether to allow the main data packet to proceed to a destination, whether and how to modify the data packet, and whether to block the data packet from proceeding. Rules can be specific to types of data packets, to the cloud server, to the virtual machine, to the virtual network, to other processing componentry, to specific client devices, etc. In general, both the virtual network and the client contribute rules to the rule set.

Referring to FIG. 4, rule sets 420 may be stored and retrieved in memory 406. Flow generation cores 412 may retrieve appropriate rule sets 420 for main data packet 410 and reverse direction data packet 418 based on the plurality of main data packet characteristics. Additional information may be retrieved from layer flow buffer 422, which may provide layer information for generating a unified flow (e.g., orders in which different rules of the rule set are applied).

Returning to FIG. 3, at 330, method 300 comprises generating a main direction unified flow for the main packet based on the main data packet characteristics and the retrieved set of rules. A flow may comprise rules that apply to similar data packets as well as the particular changes are made to those packets as a result of evaluating the rules. Each unified flow compresses the rule set, and the compressed rule set is applied to data packets by the cores.

In some examples, the main data packet characteristics will comprise a discernable pattern that match to a saved main direction unified flow where the set of rules have already been compressed into a flow. Any packet that fits the pattern will enter into the same main direction unified flow. As such, generating a main direction unified flow for the main packet include retrieving a previously generated flow stored in memory. As shown in FIG. 4, the generated main direction unified flow 424 may be stored in memory 406 in flow table 426. Once stored, the main direction unified flow 424 may be accessed and executed by flow processing cores 414. If and when a connection is closed, the main direction unified flow 424 may be deleted from flow table 426.

Returning to FIG. 3, At 340, method 300 comprises generating a speculative reverse direction unified flow for a reverse direction data packet based on the main data packet characteristics and the retrieved set of rules. When a main data packet is received, it may be assumed that there will eventually be a reverse direction data packet targeted to the sender of the main data packet. The rules for the reverse direction unified flow may be speculated at this point and saved in memory, rather than waiting for such a reverse direction data packet to arrive.

For example, as described with regard to FIG. 2, load balancing enables customers to maintain their own IP addresses that are translated to a virtual machine on a virtual network. Attaching a network header on top (e.g., encapsulate) helps facilitate the travel of the packet to the IP address of the virtual network.

For the speculative reverse direction unified flow, in load balancing examples, if the data packet was encapsulated as part of the main direction unified flow, it can be inferred that the data packet will need to be de-encapsulated as part of the reverse direction unified flow to reverse the translation, so that the client does not see the network header when the data packet returns to the client. A specific action for enacting such a rule can then be populated in the speculative reverse direction unified flow.

If a rule in the main direction unified flow allowed traffic of a data packet in one direction, it will likely be allowed to return in the opposite direction during the reverse direction unified flow. Any firewalling policy that would have superseded that rule would likely have blocked the traffic outright in the main direction.

Generally, actions taken on a data packet in the main direction may have to be undone in the reverse direction. However, this may not necessarily comprise a "reverse" action. In some examples, the reverse action to undo the main action may not be discernible until the result of the main direction unified flow is obtained. However, the speculative reverse direction unified flow can flag that something will have to happen and can maintain a placeholder for such an action.

In some examples, the main direction unified flow and the speculative reverse direction unified flow are associated via a common flow state entry. Referring to FIG. 4, speculative reverse direction unified flow 428 is stored in memory 406, while flow state entry 430 may be accessed and updated by flow processing cores 414. For example, the common flow state entry is a two-bit entry, indicating success or failure for each of the main direction unified flow and the speculative reverse direction unified flow. An additional shared state (e.g., a layer flow state) for the main direction unified flow and the speculative reverse direction unified flow may be indicated by the common flow state entry. Such shared states may be stored separately and can be retrieved through a pointer in flow state entry. The common flow state entry may store back pointers that refer to both UFs. Upon deletion, two back-to-back deletion requests can be generated from the shared flow state entry. Additional details on common flow state entries are described herein and with regard to FIG. 6.

At 350, method 300 comprises processing the main data packet based on the main direction unified flow. For example, referring to FIG. 4, Flow processing cores 414 apply and process the rules of main direction unified flow 424 to the datasets of main data packet 410. Flow processing cores 414 may be akin to processors that have access to instructions and programming. Each flow may be read out of memory 406 by flow processing cores 414 as part of their inherent programming. Flow processing cores 414 may produce or induce the production of reverse direction data packet 418. When flow processing cores 414 have completed main direction unified flow 424, flow state entry 430 may be updated to reflect a successful execution.

At 360, method 300 comprises responsive to receiving the reverse direction data packet, processing the reverse direction data packet based on the speculative reverse direction unified flow. In some examples, the reverse direction data packet is characterized by a plurality of reverse direction data packet characteristics including at least the first IP address representing a second destination and the second IP address representing a second source.

In some examples, at 370, processing the reverse direction data packet based on the speculative reverse direction unified flow further comprises, based on the plurality of reverse direction data packet characteristics, converting the speculative reverse direction unified flow to a standard reverse direction unified flow. In other words, some portions of the speculative reverse direction unified flow may be incomplete or inaccurate. But armed with the plurality of reverse direction data packet characteristics, corrections and additions may be made that complete the standard reverse direction unified flow.

Referring to FIG. 5, at 500, flow processing system 402 is shown in a second state, wherein reverse direction data packet 418 is presented to rule processing engine 404. Flow generation cores retrieve speculative reverse direction unified flow 428 from memory 406, and update the packet registry file 416 for reverse direction data packet 418. Standard reverse direction unified flow 502 is then generated and stored in memory 406 at flow table 426.

Converting the speculative reverse direction unified flow to a standard reverse direction unified flow may comprise adjusting one or more values in the speculative reverse direction unified flow based on the plurality of reverse direction data packet characteristics. In some examples, converting the speculative reverse direction unified flow to a standard reverse direction unified flow may comprise populating previously unpopulated values of the speculative reverse direction unified flow based on the plurality of reverse direction data packet characteristics.

Returning to FIG. 3 in some such examples, at 380, method 300 comprises processing the reverse direction data packet based on the standard reverse direction unified flow. For example, as shown in FIG. 5, flow processing cores 414 apply standard reverse direction unified flow 502 to reverse direction data packet 418. When reverse direction data packet 518 has been processed based on standard reverse direction unified flow 502, flow state entry 430 may be updated to reflect a successful flow execution. The main direction unified flow and the standard reverse direction unified flow may then be deleted.

Figure 6:
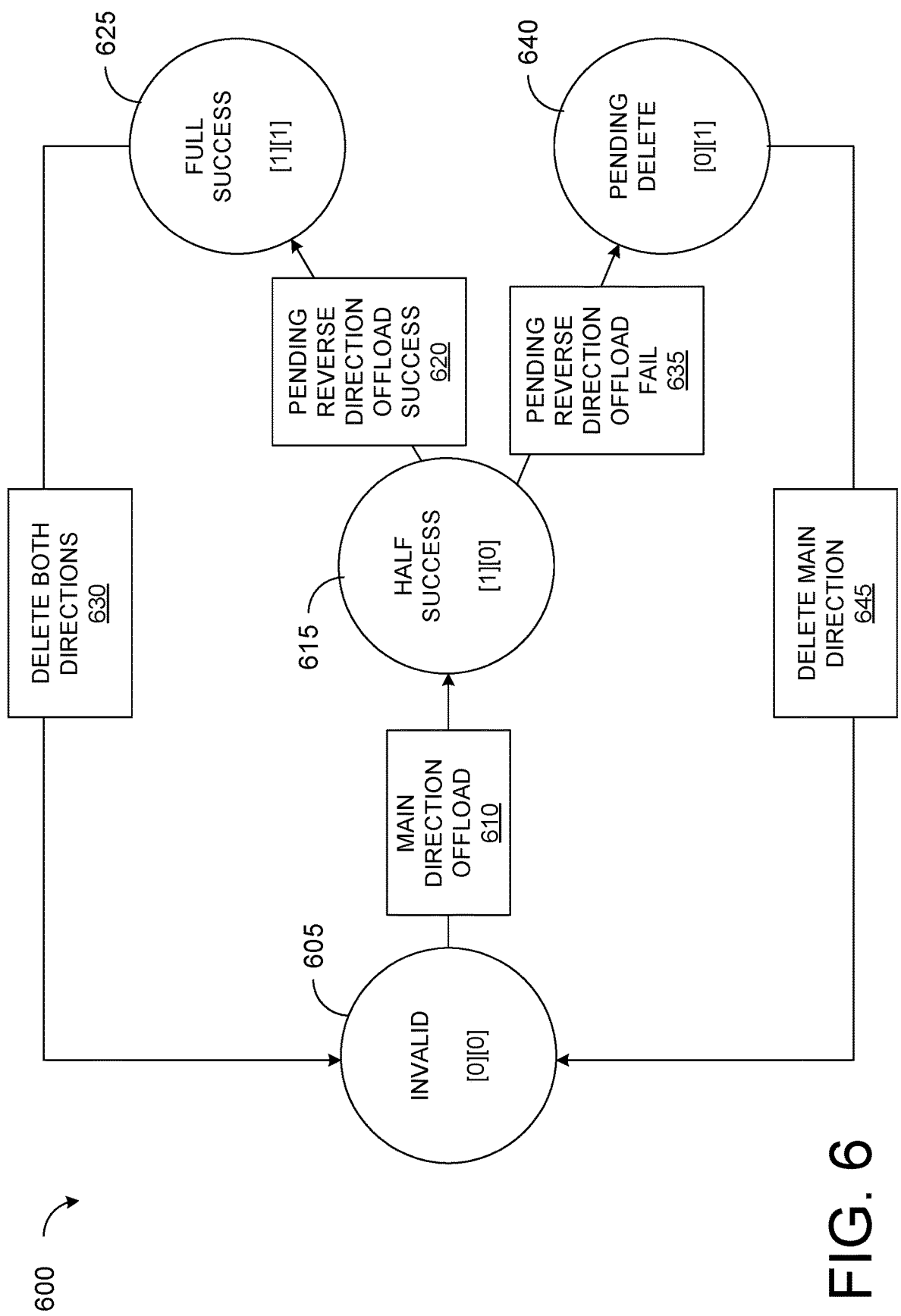
FIG. 6 is a state transition diagram for updating a shared flow state.

FIG. 6 is a state transition diagram 600 for updating a shared flow state. The flow state may be share between a main unified flow and a reverse direction unified flow. As described herein, a common flow state may be created for complementary flows at the receipt of a first data packet of a flow in a main direction. In contrast to previous flow states, a single-bit valid field is expanded into a two-bit state, represented as [A][B]. The share flow state may be used for tracking allocation and deallocation and for the linking of two flows. This shared flow state is maintained independently from any indirection entry state and any TCP state.

When a unified flow is created, the shared flow state is initially designated invalid, as shown at 605 (e.g., [0][0]). The flow in the main direction is effectively guaranteed to succeed and be offloaded, as shown at 610. In response to this offloading, the shared flow state is updated to indicate half success, as shown at 615 (e.g., [1][0]).

The reverse flow is not guaranteed to succeed. The speculation may fail, the standard reverse direction unified flow may not be able to be created from the speculative reverse direction unified flow, there may be hardware limitations that limit storage, there may be full lines or data collisions, etc. If the pending flow in the reverse direction is successfully offloaded, as shown at 620, the shared flow state is updated to indicate full success, as shown at 625 (e.g., [1][1]). As shown at 630, both flows may be deleted from the shared flow state, which then returns to the invalid state at 605.

If the pending flow in the reverse direction fails to be offloaded, as shown at 635, the shared flow state is updated to indicate pending delete, as shown at 640 (e.g., [0][1]). Flows tagged as being in the pending delete state may be deleted at a subsequent scan cycle. As shown at 645, the main flow may be deleted from the shared flow state, which then returns to the invalid state at 605. This cleans the shared flow state. In some examples, a pending delete flow state status may trigger generation of a standard reverse direction unified flow without first generating a speculative reverse direction unified flow.

The described systems and methods provide numerous technical benefits that would not be apparent based on prior systems. Preparing a speculative template for reverse flow early in the process allows acceleration of the trafficking process by both time shifting (e.g., starting the process early) and time compression (e.g., reducing the total time needed to prepare reverse direction flow). When viewed from the perspective of the logical components that program the rules for processing of data packets, the two directions of data packet flow are decoupled. The platform would not normally think about merging the processing of main and reverse trafficking.

Notably, the reverse flow is not simply the inversion of the main flow. Inverting the main flow will not provide information about the parts of the data packets that service virtual network behavior. Encapsulation and decapsulation are not inversion steps. The speculation step has to infer such details from simply looking at one main data packet at a time. Additionally, there are features in software defined networking that make data packet behavior asymmetrical. This lack of symmetry means that main data packet characteristics cannot be formulaically translated into reverse direction data packet characteristics.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
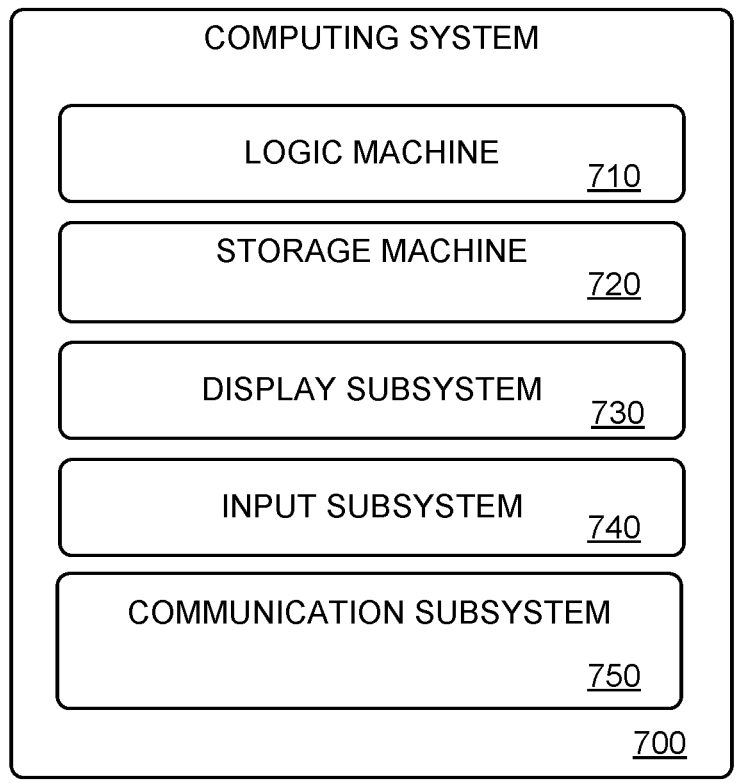
FIG. 7 schematically shows an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 710 and a storage machine 720. Computing system 700 may optionally include a display subsystem 730, input subsystem 740, communication subsystem 750, and/or other components not shown in FIG. 7. The various VMs, client devices, servers, and flow processing devices described in FIGS. 1, 2, 4, and 5 are examples of computing system 700.

Logic machine 710 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 720 includes one or more physical devices configured to hold instructions executable by the logic machine to implement the methods and processes described herein. When such methods and processes are implemented, the state of storage machine 720 may be transformed—e.g., to hold different data.

Storage machine 720 may include removable and/or built-in devices. Storage machine 720 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 720 may include volatile, nonvolatile, dynamic, static, read/write, read-only, random-access, sequential-access, location-addressable, file-addressable, and/or content-addressable devices.

It will be appreciated that storage machine 720 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 710 and storage machine 720 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 710 executing instructions held by storage machine 720. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 730 may be used to present a visual representation of data held by storage machine 720. This visual representation may take the form of a graphical user interface (GUI). As the herein described methods and processes change the data held by the storage machine, and thus transform the state of the storage machine, the state of display subsystem 730 may likewise be transformed to visually represent changes in the underlying data. Display subsystem 730 may include one or more display devices utilizing virtually any type of technology. Such display devices may be combined with logic machine 710 and/or storage machine 720 in a shared enclosure, or such display devices may be peripheral display devices.

When included, input subsystem 740 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 750 may be configured to communicatively couple computing system 700 with one or more other computing devices. Communication subsystem 750 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

In one example, a method for processing directional data packet traffic between a client device and a virtual machine comprises receiving a main data packet at a rule processing engine, the main data packet characterized by a plurality of main data packet characteristics including at least a first internet protocol (IP) address representing a first source, and a second IP address representing a first destination; based on the plurality of main data packet characteristics, retrieving a set of rules for processing the main data packet; generating a main direction unified flow for the main data packet based on the main data packet characteristics and the retrieved set of rules; generating a speculative reverse direction unified flow for a reverse direction data packet based on the main data packet characteristics and the retrieved set of rules; processing the main data packet based on the main direction unified flow; and responsive to receiving the reverse direction data packet, processing the reverse direction data packet based on the speculative reverse direction unified flow. Implementing this method of speculative generation of reverse direction flow has the technical effect of increasing the speed of communication between two computing devices. In such an example, or any other example, the reverse direction data packet is additionally or alternatively characterized by a plurality of reverse direction data packet characteristics including at least the first IP address representing a second destination and the second IP address representing a second source. In any of the preceding examples, or any other example, processing the reverse direction data packet based on the speculative reverse direction unified flow additionally or alternatively comprises based on the plurality of reverse direction data packet characteristics, converting the speculative reverse direction unified flow to a standard reverse direction unified flow; and processing the reverse direction data packet based on the standard reverse direction unified flow. In any of the preceding examples, or any other example, converting the speculative reverse direction unified flow to the standard reverse direction unified flow additionally or alternatively comprises adjusting one or more values in the speculative reverse direction unified flow based on the plurality of reverse direction data packet characteristics. In any of the preceding examples, or any other example, the main direction unified flow and the speculative reverse direction unified flow are additionally or alternatively associated via a common flow state entry. In any of the preceding examples, or any other example, the common flow state entry is additionally or alternatively a two-bit entry, indicating success or failure for each of the main direction unified flow and the speculative reverse direction unified flow. In any of the preceding examples, or any other example, an additional shared state for the main direction unified flow and the speculative reverse direction unified flow is additionally or alternatively indicated by the common flow state entry. In any of the preceding examples, or any other example, the first IP address is additionally or alternatively for the virtual machine. In any of the preceding examples, or any other example, the second IP address is additionally or alternatively for the virtual machine.

In another example, a flow processing system for trafficking directional data packets between a source device and a destination device, comprises a memory; and a rule processing engine comprising one or more flow generation cores configured to receive a main data packet, the main data packet characterized by a plurality of main data packet characteristics including at least a first internet protocol (IP) address representing a first source, and a second IP address representing a first destination; retrieve, from memory, a set of rules for processing the main data packet based on the plurality of main data packet characteristics; generate a main direction unified flow for the main data packet based on the main data packet characteristics and the retrieved set of rules; and generate a speculative reverse direction unified flow for a reverse direction data packet based on the main data packet characteristics and the retrieved set of rules; and one or more flow processing cores configured to: process the main data packet based on the main direction unified flow; and responsive to receiving the reverse direction data packet, process the reverse direction data packet based on the speculative reverse direction unified flow. In such an example, or any other example, the reverse direction data packet is additionally or alternatively characterized by a plurality of reverse direction data packet characteristics including at least the first IP address representing a second destination and the second IP address representing a second source. In any of the preceding examples, or any other example, processing the reverse direction data packet based on the speculative reverse direction unified flow additionally or alternatively comprises at the one or more flow generation cores, based on the plurality of reverse direction data packet characteristics, convert the speculative reverse direction unified flow to a standard reverse direction unified flow; and at the one or more flow processing cores, process the reverse direction data packet based on the standard reverse direction unified flow. Generating the reverse direction flow from a speculated flow provides the technical effect of reducing processor load. In any of the preceding examples, or any other example, converting the speculative reverse direction unified flow to the standard reverse direction unified flow additionally or alternatively comprises adjusting one or more values in the speculative reverse direction unified flow based on the plurality of reverse direction data packet characteristics. In any of the preceding examples, or any other example, the main direction unified flow and the speculative reverse direction unified flow are additionally or alternatively associated via a common flow state entry stored in the memory. In any of the preceding examples, or any other example, the common flow state entry is additionally or alternatively a two-bit entry, indicating success or failure for each of the main direction unified flow and the speculative reverse direction unified flow. In any of the preceding examples, or any other example, an additional shared state for the main direction unified flow and the speculative reverse direction unified flow is additionally or alternatively indicated by the common flow state entry. In any of the preceding examples, or any other example, the first IP address is additionally or alternatively for a virtual machine. In any of the preceding examples, or any other example, the second IP address is additionally or alternatively for a virtual machine.

In yet another example a method for processing directional data packet traffic between a client device and a virtual machine comprises receiving a main data packet at a network interface, the main data packet characterized by a plurality of main data packet characteristics including at least a first internet protocol (IP) address representing a first source, and a second IP address representing a first destination; based on the plurality of main data packet characteristics, retrieving a set of rules for processing the main data packet, including a rule for modifying the second IP address to a third IP address; generating a main direction unified flow for the main data packet based on the main data packet characteristics and the retrieved set of rules; generating a speculative reverse direction unified flow for a reverse direction data packet based on the main data packet characteristics and the retrieved set of rules; processing the main data packet based on the main direction unified flow at least by modifying the second IP address to the third IP address; and responsive to receiving the reverse direction data packet, processing the reverse direction data packet based on the speculative reverse direction unified flow. In such an example, or any other example, processing the reverse direction data packet based on the speculative reverse direction unified flow additionally or alternatively comprises at least modifying the third IP address to the second IP address. Implementing this method of speculative generation of reverse direction flow has the technical effect of increasing the speed of communication between two computing devices.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for processing directional data packet traffic between a client device and a virtual machine, comprising:
    receiving a main data packet at a rule processing engine, the main data packet characterized by a plurality of main data packet characteristics including at least a first internet protocol (IP) address representing a first source, and a second IP address representing a first destination;
    based on the plurality of main data packet characteristics, retrieving a set of rules for processing the main data packet;
    generating a main direction unified flow for the main data packet based on the main data packet characteristics and the retrieved set of rules;
    generating a speculative reverse direction unified flow for a reverse direction data packet based on the main data packet characteristics and the retrieved set of rules, wherein the reverse direction data packet is characterized by a plurality of reverse direction data packet characteristics;
    processing the main data packet based on the main direction unified flow; and
    responsive to receiving the reverse direction data packet, processing the reverse direction data packet based on the speculative reverse direction unified flow by at least converting the speculative reverse direction unified flow to a standard reverse direction unified flow based on the plurality of reverse direction data packet characteristics, and processing the reverse direction data packet based on the standard reverse direction unified flow.

2. The method of claim 1, wherein the plurality of reverse direction data packet characteristics include at least the first IP address representing a second destination and the second IP address representing a second source.

3. The method of claim 1, wherein converting the speculative reverse direction unified flow to the standard reverse direction unified flow comprises adjusting one or more values in the speculative reverse direction unified flow based on the plurality of reverse direction data packet characteristics.

4. The method of claim 1, wherein the main direction unified flow and the speculative reverse direction unified flow are associated via a common flow state entry.

5. The method of claim 4, wherein the common flow state entry is a two-bit entry, indicating success or failure for each of the main direction unified flow and the speculative reverse direction unified flow.

6. The method of claim 4, wherein an additional shared state for the main direction unified flow and the speculative reverse direction unified flow is indicated by the common flow state entry.

7. The method of claim 1, wherein the first IP address is for the virtual machine.

8. The method of claim 1, wherein the second IP address is for the virtual machine.

9. A flow processing system for trafficking directional data packets between a source device and a destination device, comprising:
    a memory; and
    a rule processing engine, comprising:
        one or more flow generation cores configured to:
            receive a main data packet, the main data packet characterized by a plurality of main data packet characteristics including at least a first internet protocol (IP) address representing a first source, and a second IP address representing a first destination;
            retrieve, from memory, a set of rules for processing the main data packet based on the plurality of main data packet characteristics;
            generate a main direction unified flow for the main data packet based on the main data packet characteristics and the retrieved set of rules;
            generate a speculative reverse direction unified flow for a reverse direction data packet based on the main data packet characteristics and the retrieved set of rules, wherein the reverse direction data packet is characterized by a plurality of reverse direction data packet characteristics; and convert the speculative reverse direction unified flow to a standard reverse direction unified flow based on the plurality of reverse direction data packet characteristics; and one or more flow processing cores configured to:
  process the main data packet based on the main direction unified flow; and
  responsive to receiving the reverse direction data packet, process the reverse direction data packet based on the standard reverse direction unified flow.

10. The flow processing system of claim 9, wherein the plurality of reverse direction data packet characteristics include at least the first IP address representing a second destination and the second IP address representing a second source.

11. The flow processing system of claim 9, wherein converting the speculative reverse direction unified flow to the standard reverse direction unified flow comprises adjusting one or more values in the speculative reverse direction unified flow based on the plurality of reverse direction data packet characteristics.

12. The flow processing system of claim 9, wherein the main direction unified flow and the speculative reverse direction unified flow are associated via a common flow state entry stored in the memory.

13. The flow processing system of claim 12, wherein the common flow state entry is a two-bit entry, indicating success or failure for each of the main direction unified flow and the speculative reverse direction unified flow.

14. The flow processing system of claim 12, wherein an additional shared state for the main direction unified flow and the speculative reverse direction unified flow is indicated by the common flow state entry.

15. The flow processing system of claim 9, wherein the first IP address is for a virtual machine.

16. The flow processing system of claim 9, wherein the second IP address is for a virtual machine.

17. A method for processing directional data packet traffic between a client device and a virtual machine, comprising:
  receiving a main data packet at a network interface, the main data packet characterized by a plurality of main data packet characteristics including at least a first internet protocol (IP) address representing a first source, and a second IP address representing a first destination;
  based on the plurality of main data packet characteristics, retrieving a set of rules for processing the main data packet, including a rule for modifying the second IP address to a third IP address;
  generating a main direction unified flow for the main data packet based on the main data packet characteristics and the retrieved set of rules;
  generating a speculative reverse direction unified flow for a reverse direction data packet based on the main data packet characteristics and the retrieved set of rules, wherein the reverse direction data packet is characterized by a plurality of reverse direction data packet characteristics;
  processing the main data packet based on the main direction unified flow at least by modifying the second IP address to the third IP address; and
  responsive to receiving the reverse direction data packet, processing the reverse direction data packet based on the speculative reverse direction unified flow by at least converting the speculative reverse direction unified flow to a standard reverse direction unified flow based on the plurality of reverse direction data packet characteristics, and processing the reverse direction data packet based on the standard reverse direction unified flow.

18. The method of claim 17, wherein processing the reverse direction data packet based on the speculative reverse direction unified flow comprises at least modifying the third IP address to the second IP address.

* * * * *